(12) United States Patent
Hara et al.

(10) Patent No.: US 7,757,645 B2
(45) Date of Patent: Jul. 20, 2010

(54) VARIABLE VALVE SYSTEM FOR INTERNAL COMBUSTION ENGINE

(75) Inventors: Seinosuke Hara, Atsugi (JP); Makoto Nakamura, Isehara (JP)

(73) Assignee: Hitachi, Ltd., Tokyo (JP)

( * ) Notice: Subject to any disclaimer, the term of this patent is extended or adjusted under 35 U.S.C. 154(b) by 410 days.

(21) Appl. No.: 11/987,329

(22) Filed: Nov. 29, 2007

(65) Prior Publication Data
US 2008/0141961 A1    Jun. 19, 2008

(30) Foreign Application Priority Data
Dec. 15, 2006    (JP) .............................. 2006-337809

(51) Int. Cl.
*F01L 1/34* (2006.01)
(52) U.S. Cl. .............. 123/90.16; 123/90.39; 123/90.44; 74/569
(58) Field of Classification Search .............. 123/90.16, 123/90.2, 90.27, 90.31, 90.39, 90.44; 74/559, 74/567, 569
See application file for complete search history.

(56) References Cited

U.S. PATENT DOCUMENTS 6,123,053 A       9/2000  Hara et al.
7,246,578 B2 *    7/2007  Nakamura et al. ....... 123/90.16

FOREIGN PATENT DOCUMENTS

| JP | 2000-038910 A | 2/2000 |
| JP | 2005-344609 A | 12/2005 |
| JP | 2006-161586 A | 6/2006 |

* cited by examiner

*Primary Examiner*—Ching Chang
(74) *Attorney, Agent, or Firm*—Foley & Lardner LLP

(57) ABSTRACT

A variable valve system for an internal combustion engine includes a drive shaft rotated by an engine crankshaft, a drive cam integrally mounted on the drive shaft, first and second swing cams mounted on first and second engine valves in each engine cylinder, a valve lift mechanism for converting a rotational movement of the drive cam into swing movements of the first and second swing cams to open and close the first and second engine valves, and a control mechanism for controlling the operating position of the valve lift mechanism to vary the valve lifts of the first and second engine valves according to engine operating conditions. The valve lifts of the first and second engine valves are different from each other when the control mechanism performs minimum lift control on the valve lift mechanism to control the valve lifts of the first and second engine valves to minimum lifts.

20 Claims, 9 Drawing Sheets

VARIABLE VALVE SYSTEM FOR INTERNAL COMBUSTION ENGINE

BACKGROUND OF THE INVENTION

The present invention relates to a variable valve system for varying the valve lifts of engine valves such as intake valves or exhaust valves in each cylinder of an internal combustion engine in accordance with engine operating conditions.

Various types of variable valve systems have been proposed for internal combustion engines. Japanese Laid-Open Patent Publication No. 2000-38910 (abbreviated as "JP2000-38910A") and Japanese Laid-Open Patent Publication No. 2006-161586 (abbreviated as "JP2006-161586A") disclose variable intake valve systems, each of which is configured to vary the valve lifts and working angles of two intake valves in each cylinder of the internal combustion engine. The variable intake valve system of JP2000-38910A includes a drive shaft rotated by a crankshaft of the engine, two drive cams integrally mounted on the drive shaft, two swing cams mounted on the intake valves, two valve lift mechanisms for converting rotational movements of the drive cams into swing movements of the swing cams so as to open and close the intake valves and two control mechanisms for controlling the operating positions of the valve lift mechanisms so as to vary the valve lifts and working angles of the intake valves according to engine operating conditions. The variable intake valve system of JP2006-161586A includes a drive shaft rotated by a crankshaft of the engine, a drive cam integrally mounted on the drive shaft, a valve lift mechanism for converting a rotational movement of the drive cam into a swing movement of the swing cam so as to open and close the intake valves and a control mechanism for controlling the operating position of the valve lift mechanism so as to vary the valve lifts and working angles of the intake valves according to engine operating conditions.

SUMMARY OF THE INVENTION

However, the variable intake valve system of JP2000-38910 utilizes two sets of valve lift and control mechanisms to individually vary the valve lifts and working angles of two intake valves in the engine cylinder so that the structure of the variable valve system becomes complicated to cause increases in process costs due to intricate manufacturing and assembling processes. The variable intake valve system of JP2006-161586A utilizes a single set of valve lift and control mechanisms and cannot individually vary the valve lifts and working angles of two intake valves in the engine cylinder for improves in engine combustion stability and fuel efficiency.

It is therefore an object of the present invention to provide a variable valve system having a simple structure for individually varying the valve lifts of engine valves such as intake valves or exhaust valves in each cylinder of an internal combustion engine in accordance with engine operating conditions so as to obtain improves in engine combustion stability and fuel efficiency.

According to a first aspect of the present invention, there is provided a variable valve system for an internal combustion engine, the engine having first and second engine valves in either an intake side or an exhaust side of each cylinder, the variable valve system comprising: a drive shaft rotated by a crankshaft of the engine; a drive cam integrally mounted on the drive shaft; first and second swing cams mounted on the first and second engine valves, respectively; a valve lift mechanism for converting a rotational movement of the drive cam into swing movements of the first and second swing cams so as to open and close the first and second engine valves; and a control mechanism for controlling the operating position of the valve lift mechanism so as to vary the valve lifts of the first and second engine valves continuously in accordance with engine operating conditions, wherein the valve lifts of the first and second engine valves are different from each other when the control mechanism performs minimum lift control on the valve lift mechanism to control the valve lifts of the first and second engine valves to minimum lifts.

According to a second aspect of the present invention, there is provided a variable valve system for an internal combustion engine, the engine having first and second engine valves in either an intake side or an exhaust of each cylinder, the variable valve system comprising: a drive shaft rotated by a crankshaft of the engine; a drive cam integrally mounted on the drive shaft; first and second swing cams mounted on the first and second engine valves, respectively; a valve lift mechanism for converting a rotational movement of the drive cam into swing movements of the first and second swing cams so as to open and close the first and second engine valves; and a control mechanism for controlling the valve lift mechanism to vary the valve lifts of the first and second engine valves continuously in accordance with engine operating conditions, wherein the valve lifts of the first and second engine valves are different from each other when the control mechanism performs minimum lift control on the valve lift mechanism to control the valve lifts of the first and second engine valves to minimum lifts; and the valve lifts of the first and second engine valves are substantially the same when the control mechanism performs maximum lift control on the valve lift mechanism to control the valve lifts of the first and second engine valves to maximum lifts.

According to a third aspect of the present invention, there is provided a variable valve system for an internal combustion engine, the engine having first and second engine valves in either an intake side or an exhaust side of each cylinder, the variable valve system comprising: a drive shaft rotated by a crankshaft of the engine; a drive cam integrally mounted on the drive shaft; first and second swing cams mounted on the first and second engine valves, respectively; a valve lift mechanism for converting a rotational movement of the drive cam into swing movements of the first and second swing cams so as to open and close the first and second engine valves; and a control mechanism for controlling the operating position of the valve lift mechanism so as to vary the valve lifts of the first and second engine valves continuously in accordance with engine operating conditions, wherein the valve lift of the first engine valve is smaller than the valve lift of the second engine valve when the control mechanism performs minimum lift control on the valve lift mechanism to control the valve lifts of the first and second engine valves to minimum lifts; and the valve lift of the first engine valve is larger than the valve lift of the second engine valve when the control mechanism performs maximum lift control on the valve lift mechanism to control the valve lifts of the first and second engine valves to maximum lifts.

The other objects and features of the present invention will also become understood from the following description.

DESCRIPTIONS OF THE EMBODIMENTS

The present invention will be described in detail below by way of the following first, second and third embodiments, each of which specifically refers to a variable intake valve system for an internal combustion engine.

First Embodiment

Figure 1:
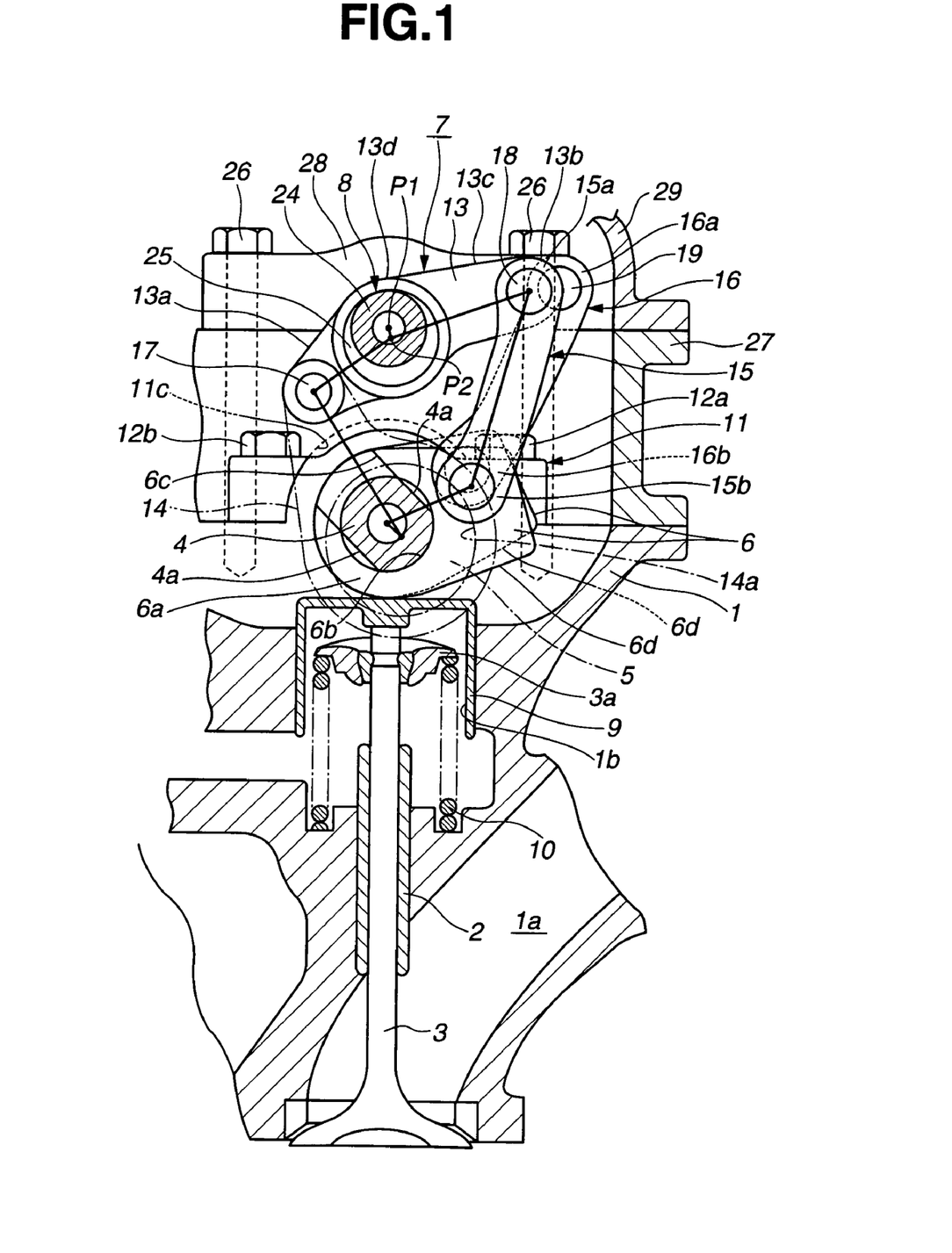
FIGS. 1, 2 and 3 are a sectional view, a front view and a top view of a variable valve system for an internal combustion engine according to a first embodiment of the present invention.
Figure 2:
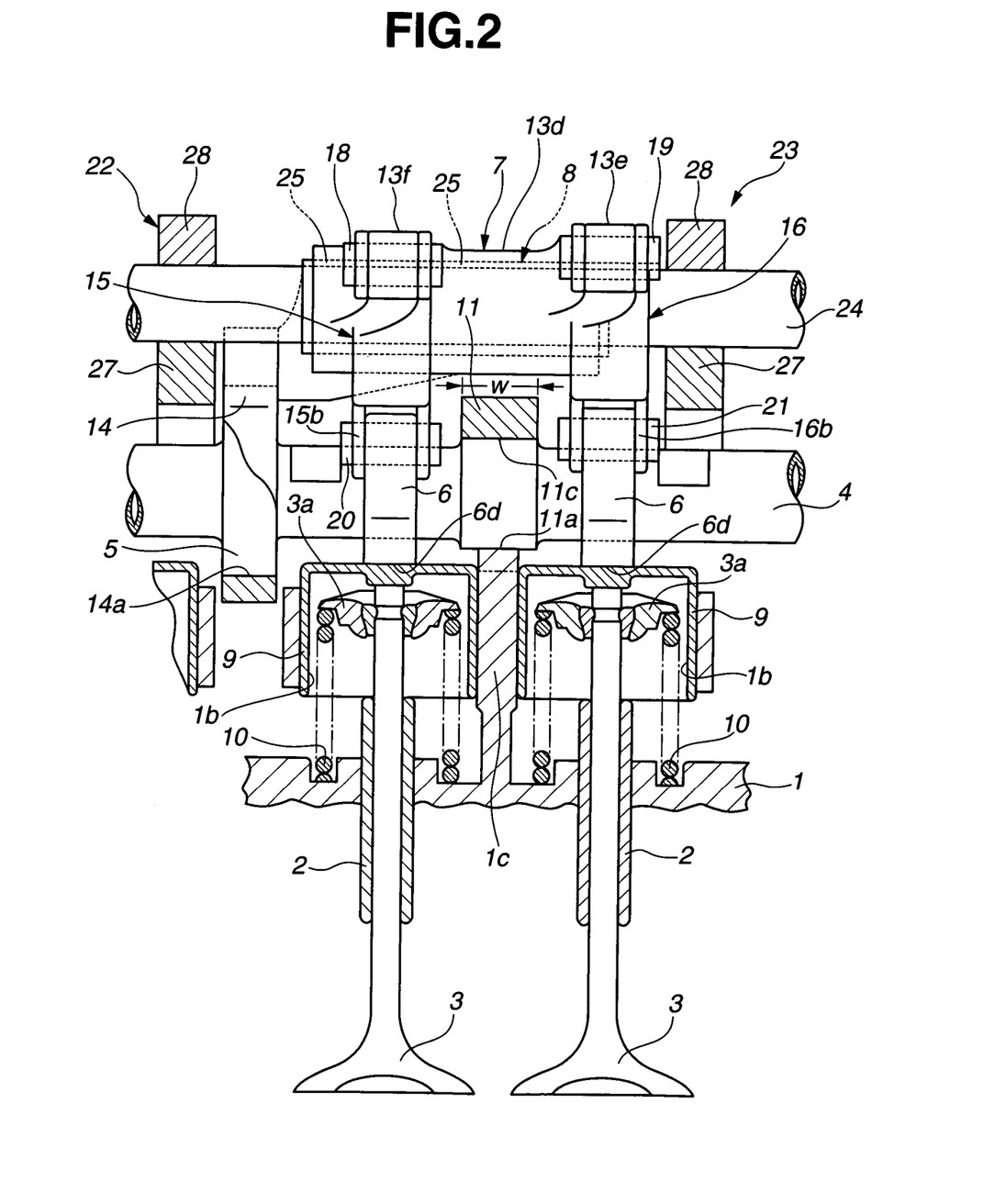

Herein, a cylinder head 1 of the engine locates two intake valves 3 (hereinafter occasionally referred to as "first and second intake valves") in each cylinder. As shown in FIGS. 1 and 2, an upper portion of the cylinder head 1 has two bores 1b corresponding in position to the respective intake valves 3 and a partition wall 1c between the bores 1b. Further, two valve guides 2 are disposed coaxially with the bores 1b. The stems of the intake valves 3 are slidably fitted in the valve guides 2 such that the heads of the intake valves 3 open and close engine intake ports 1a. Spring retainers 3a are fixed to upper ends of the stems of the intake valves 3 via cotters and retain valve springs 10 between the cylinder head 1 and the spring retainers 3a and thereby apply tensions of the valve springs 10 to the intake valves 3a in a valve closing direction.

Figure 3:
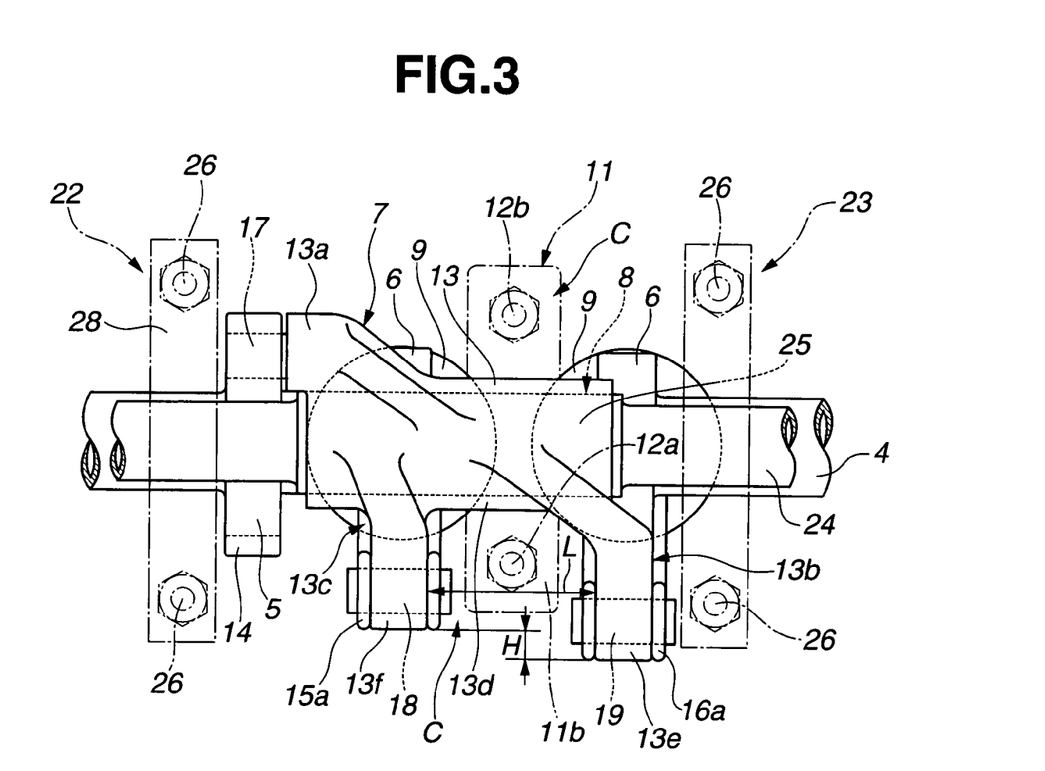

Referring to FIGS. 1 to 3, the variable valve system is mounted on the cylinder head 1 and includes a drive shaft 4 supported by a first bearing 11 on the cylinder head 1 and rotated by a crankshaft of the engine, a drive cam 5 integrally mounted on the drive shaft 4, two swing cams 6 (hereinafter occasionally referred to as "first and second swing cams") swingably mounted on the respective first and second intake valves 3 via valve lifters 9, a valve lift mechanism 7 for converting a rotational movement of the drive cam 5 to swing movements of the swing cams 6 so as to move the valve lifters 9 and thereby open the intake valves 3 against the tensions of the valve springs 10 or close the intake valves 3 under the tensions of the valve springs 10 and a control mechanism 8 for controlling the operating position of the valve lift mechanism 7 so as to vary the valve lifts and working angles of the intake valves 3 continuously in accordance with engine operating conditions.

The drive shaft 4 is arranged along a front/rear direction of the engine, with one end thereof located adjacent to the engine cylinder, and is made hollow so as to define therein an oil passage in communication with a main oil gallery of the engine. The drive shaft 4 has a driven sprocket on the other end thereof coupled to a drive sprocket of the engine crankshaft via a timing chain so that the rotation of the engine crankshaft is transmitted to the drive shaft 4 through the sprockets and the timing chain. In the first embodiment, the rotational center of the drive shaft 4 is located above the extensions of the axes of the intake valves 3 as shown in FIG. 1. The drive shaft 4 also has two narrowed portion 4a axially outside of the swing cams 6. Each of the narrowed portions 4a is formed by e.g. cutting the outer circumferential surface of the drive shaft 4 to define opposite parallel flattened areas on the narrowed portion 4a. The width of the narrowed portion 4a between these opposite parallel flattened areas is then made smaller than the diameter of the drive shaft 4.

The drive cam 5 is formed into a disk shape with a relatively large thickness and has a center base portion integrally fixed to the cylinder-side end of the drive shaft 4, with the rotational center Y of the drive cam 5 displaced by a given amount from the rotational center X of the drive shaft 4, to define an eccentric circular cam profile.

Each of the valve lifters 9 is formed into a cylindrical shape with a closed upper end and is slidably fitted in the bore 1b of the cylinder head 1.

The swing cams 6 are substantially formed into the same raindrop shape. Each of the swing cams 6 has a base portion 6a formed with a center through hole 6b and an engagement portion 6c formed on the outer circumferential surface of the base portion 6a and is swingably mounted on the drive shaft 4 by fitting the drive shaft 4 in the through hole 6b and engaging the engagement portion 6c with the narrowed shaft portion 4a. Further, each of the swing cams 6 has a cam face 6d at a bottom thereof. The cam face 6d includes a base circle area extending on the cam base portion 6a, a lift area continuing to the top (maximum valve lift area) of the cam nose and an arc ramp area extending between the base circle area and the lift area so that either of the base circle area, the ramp area and the lift area of the cam face 6d and the top of the cam nose comes into contact with a given portion of the upper end of the valve lifter 9 and thereby moves up and down the valve lifter 9 in response to the swing movement of the swing cam 6. Although not shown in the drawings, pin holes are formed in the cam noses of the swing cams 6.

The first bearing 11 is located on the upper portion of the cylinder head 1 at a position between the swing cams 6 and has a first bearing groove 11a formed in an upper surface of the partition wall 1c, a bearing bracket 1b fixed at both ends thereof to the upper surface of the partition wall 1c by bolts 12a and 12b and a second bearing groove 11c formed in the center of the bearing bracket 11b. In the first embodiment, the bracket fixing bolts 12a and 12b are symmetric in position with respect to the drive shaft 4 as shown in FIG. 3. Further, the axial width W of the bearing bracket 11b is larger than the width of the partition wall 1c as shown in FIG. 2. Both of the first bearing groove 11a and the second bearing groove 11c are semicylindrical in shape so that the first bearing 11 supports a journal portion of the drive shaft 4 in these semicylindrical bearing grooves 1a and 1c in such a manner as to allow the drive shaft 4 to rotate in one direction.

Referring again to FIGS. 1 to 3, the valve lift mechanism 7 includes a rocker arm 13 located above the drive shaft 4, a link arm 14 through which the rocker arm 13 is linked to the drive cam 5 and a pair of link rods 15 through which the rocker arm 13 is linked to the swing cams 6.

The rocker arm 13 has a cylindrical base portion 13d formed with a lateral through hole, a first arm portion 13a formed on one side of the base portion 13d and second arm portions 13b and 13c formed on the other side of the base portion 13d. The first arm portion 13a is projected at a given angle from around the center of the base portion 13d with an arm end thereof axially directed toward the drive cam 5. A pin hole is made in the end of the first arm portion 13a. On the other hand, the second arm portions 13b and 13c are arranged in a bifurcated shape (Y-shape). The second arm portion 13b is projected from around the center of the base portion 13d substantially diagonally opposite to the first arm portion 13a and bent at a center thereof to form a free arm end 13e perpendicular to the base portion 13d. The second arm portion 13c is projected at a given angle from the drive-cam-side end of the base portion 13d and bent at a center thereof to form a free arm end 13f perpendicular to the base portion 13d and in parallel with the free arm end 13e. As shown in FIG. 3, the arm ends 13e and 13f of the second arm portions 13b and 13c are spaced away to leave a relatively large distance L therebetween, with the bracket fixing bolt 12a located midway between these arm portions 13b and 13c. There are also some spaces C left above the bolts 12a and 12b by the specific configurations of the arm portions 13a, 13b and 13c of the rocker arm 13 so that a tool (such as a wrench) can be inserted into the spaces C for the purpose of tightening the bolts 12a and 12b. Further, the arm end 13e of the second arm portion 13b is made longer by a given length H and slightly higher in position than the arm end 13f of the second arm portion 13c to provide a difference H between the projection amounts (lengths) of the arm ends 13e and 13f as shown in FIGS. 1 and 3.

The link arm 14 has an annular ring portion of relatively large diameter and a portion projecting at a given position from the outer circumferential surface of the annular ring portion. The annular ring portion of the link arm 14 is formed with a center through hole 14a so that the drive cam 5 is rotatably fitted in the through hole 14a. The projecting portion of the link arm 14 is fixed to the first arm portion 13a of the rocker arm 13 by press fitting a pin 17 into the pin hole of the first arm portion 13a so as to allow relative pivotal movement between the rocker arm 13 and the link arm 14.

The link rods 15 and 16 are bent by press forming into a substantially U-shaped cross section and have upper and lower double-plate ends 15a, 15b, 16a and 16b to sandwich therebetween the arm ends 13e and 13f of the rocker arm 13 and the cam noses of the swing cams 6. The upper ends 15a and 16a of the link rods 15 and 16 are pivotally connected by pins 18 and 19 to the respective arm ends 13e and 13f of the rocker arm 13, whereas the lower ends 15b and 16b of the link rods 15 and 16 are pivotally connected by pins 20 and 21 to the respective cam noses of the first and second swing cams 6.

As the projection amount of the rocker arm end 13e is set larger than the projection amount of the rocker arm end 13f, the link rod 16 tilts to a greater angle than the link rod 15 so that the upper end 16a of the link rod 16 is held at a position outside of and slightly higher than the upper end 15a of the link rod 15. It is thus possible to provide different rocker ratios relative to the swing cams 6 depending on the difference H between the projection amounts (lengths) of the rocker arm ends 13e and 13f.

In addition, the pin 17 not only provides a connection between the first arm portion 13a of the rocker arm 13 and the projecting portion of the link arm 14 but also functions as a bearing to pivotally support the first arm portion 13a of the rocker arm 13. Similarly, the pins 18 and 19 not only provide connections between the arm ends 13e and 13f of the rocker arm 13 and the upper ends 15a and 16a of the link rods 15 and 16 but also function as bearings to pivotally support second arm portions 13b and 13c of the rocker arm 13. These bearings are arranged on opposite sides of the drive shaft 4. With such a bearing arrangement, it is possible to limit the tilt and displacement of the drive shaft 4 with a high degree of precision.

Referring further again to FIGS. 1 to 3, the control mechanism 8 includes a control shaft 24 rotatably supported by second bearings 22 and 23 on the cylinder head 1 and a control cam 25 mounted integrally on an outer circumferential surface of the control shaft 24.

The control shaft 24 is arranged along the front/rear direction of the engine in parallel with the drive shaft 4 and passed through the lateral through hole of the rocker arm 13. One end of the control shaft 24 is connected to an electric actuator via a reduction gear so that the electric actuator to rotate the control shaft 24 within a given angular range.

The control cam 25 is formed into a cylindrical shape and integrally mounted on the control shaft 24 within the lateral through hole of the rocker arm 13 so that the rocker arm 13 can pivot about the control cam 25. As shown in FIG. 3, the length of the control cam 25 is substantially equal to the axial length of the cylindrical base portion 13d of the rocker arm 13. The rotational center P2 of the control cam 25 is displaced by a given amount corresponding to a thickness of the control cam 25 from the axis P1 of the control shaft 24.

Figure 8:
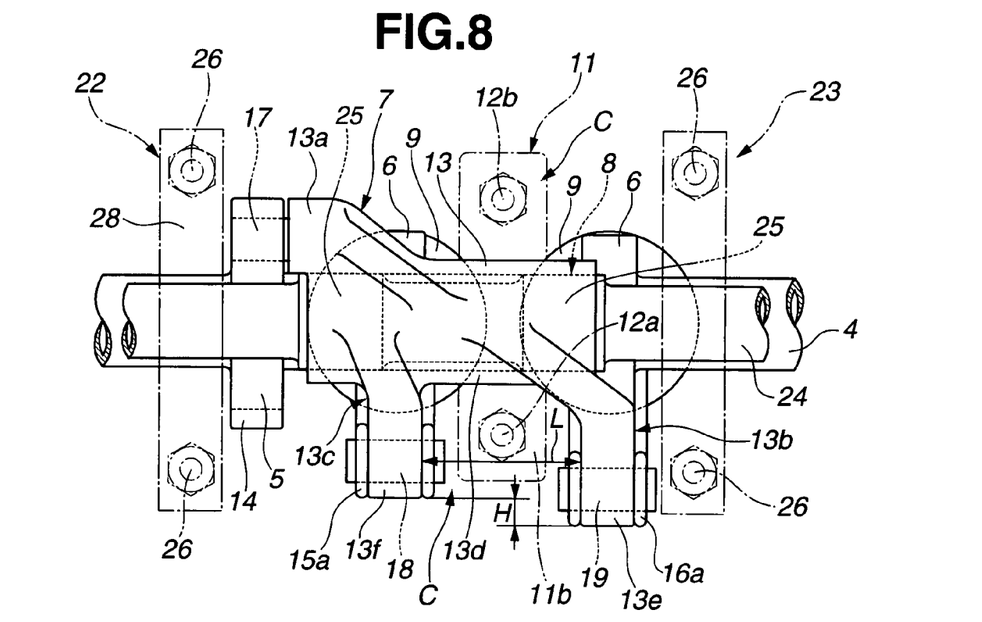
FIG. 8 is a top view of a variable valve system according to a modification of the first embodiment of the present invention.

For reduction in weight, the control cam 25 may alternatively have two axially aligned end parts as shown in FIG. 8.

The second bearings 22 and 23 are provided on the upper portion of the cylinder head 1 at opposite sides of the rocker arm 13 (more specifically, axially outside of the drive cam 5 and the second end portion 13b of the rocker arm 13). Each of the bearings 22 and 23 has a frame-shaped carrier bracket 27 fixed at both end thereof to the upper portion of the cylinder head 1, a bearing bracket 28 fixed to the upper side of the carrier bracket 27 and bearing grooves formed in the upper side of the carrier bracket 27 and the lower side of the bearing bracket 28. The carrier bracket 27 and the bearing bracket 28 are secured together by bolts 26. Both of the bearing grooves are semicylindrical in shape so that the second bearings 22 and 23 rotatably support the control shaft 24 in these semicylindrical bearing grooves. Further, a head cover 29 is attached to an upper end of the carrier bracket 27.

The electric actuator operates under the control of an electronic engine controller. The engine controller includes a microcomputer to determine current engine operation conditions based on detection signals from various sensors such as a crank angle sensor (for detecting a rotational position of the engine crankshaft), an air flow meter, a coolant temperature sensor and a control shaft angle sensor (for detecting a rotational angle of the control shaft 24) and output a control signal to the electric actuator and thereby cause the control mechanism 8 to vary the valve lifts of the intake valves 3 from minimum lifts (substantially zero) to maximum lifts by adjusting the rotational position of the control cam 25 with respect to the engine crank angle according to the engine operating conditions.

The variable valve system operates as follows.

Figure 4A:
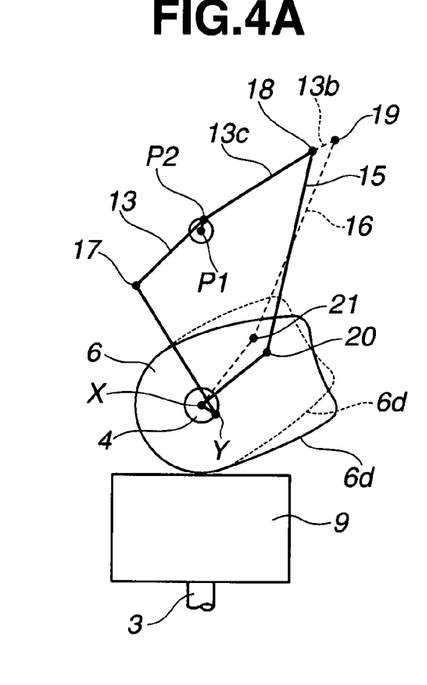
FIGS. 4A and 4B are schematic views showing minimum valve lift control operations of the variable valve system according to the first embodiment of the present invention.
Figure 4B:
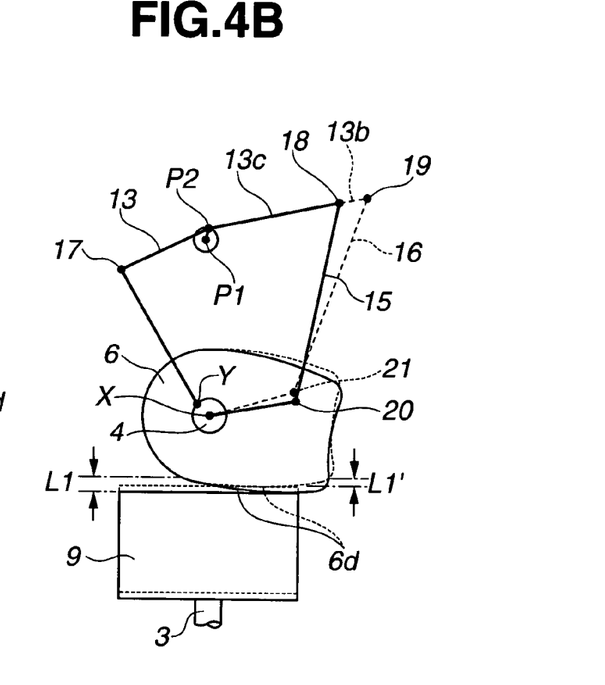
Figure 4C:
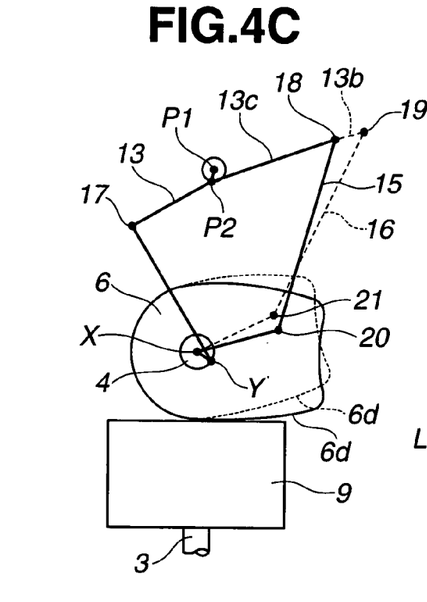
FIGS. 4C and 4D are schematic views showing maximum valve lift control operations of the variable valve system according to the first embodiment of the present invention.

During minimum valve lift control operations, the control shaft 24 is rotated by the electric actuator under the control signal from the engine controller so that the control cam 25 rotates in a counterclockwise direction relative to the control shaft 24 as viewed in FIGS. 1, 4A and 4B and becomes held at a given angular position. The rocker arm 13 pivots by such a counterclockwise rotation of the control cam 25 and raises the second arm portions 13b and 13c to pull up the cam noses of the swing cams 6 through the link rods 15 and 16. The swing positions of the swing cams 6 are thus shifted in a counterclockwise direction as shown in FIG. 4A with respect to the swing position shown in FIG. 1.

Figure 5A:
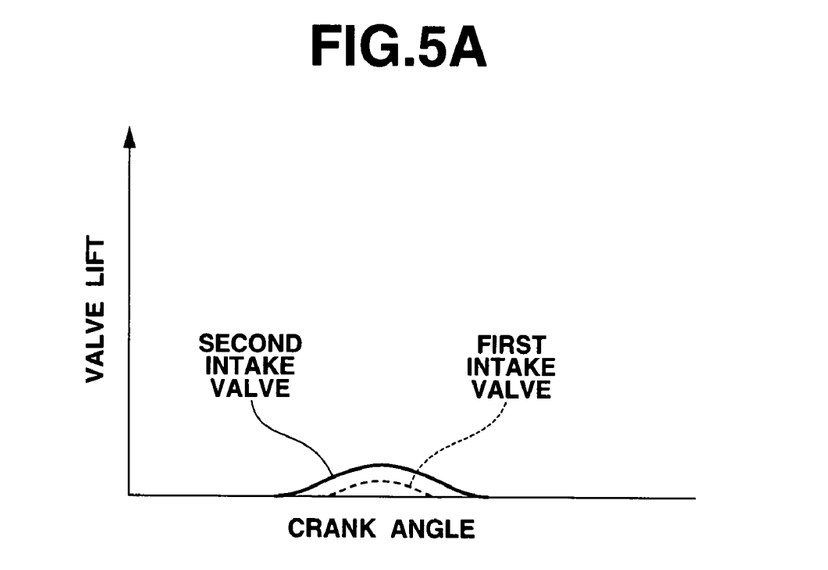
FIGS. 5A and 5B are graphs showing valve lift characteristics of engine valves under the minimum and maximum valve lift control operations of the variable valve system according to the first embodiment of the present invention.

When the drive cam 5 rotates together with the drive shaft 4 in this state, the link arm 14 moves the first arm portion 13a of the rocker arm 13 so that the rocker arm 13 swings the swing cams 6 through the link rods 15 and 16. As shown in FIG. 4A, the intake valves 3 are kept closed by contact of the base circle areas of the swing cams 6 with the valve lifters 9. The intake valves 3 are lifted up by contact of the lift areas of the swing cams 6 with the valve lifters 9 as shown in FIG. 4B. As a result, the valve lifts of the intake valves 3 become small during the minimum valve lift control operations such that the valve opening timings of the first and second intake valves 3 are retarded to decrease the valve overlaps between the intake valves 3 and exhaust valves as shown in FIG. 5A.

As described above, the rocker arm 13 provides different rocker ratios relative to the swing cams 6 as the projection amount of the rocker arm end 13e is set larger than the projection amount of the rocker arm end 13f. Accordingly, the valve lifts of the first and second intake valves 3 are controlled to different degrees L1' and L1 even when the rocker arm ends 13e and 13f moves through the same amount of stroke under the minimum valve lift control operations. More specifically, the valve lift characteristics of the first and second intake valves 3 are similar in waveform but different in amplitude under the minimum valve lift control operations as shown in FIG. 5A. The valve lift L1' of the first intake valve 3 is smaller than the valve lift L1 of the second intake valve 3 to provide a small, substantially constant amount of difference between the intake valve lifts L1' and L1 with respect to the crank angle and thereby retard the valve opening timing of the first intake valve 3 relative to that of the second intake valve 3 and advance the valve closing timing of the first intake valve 3 relative to that of the second intake valve 3.

It is likely that the combustion state of the engine will become unstable under low-speed, low-load engine conditions.

In the first embodiment, however, the amount of intake from the second intake valve 3 is made larger than that from the first intake valve 3 due to the difference between the valve lifts L1' and L1 of the first and second intake valves 3 (i.e. due to the difference between the opening/closing timings of the first and second intake valves 3), thereby causing a strong swirl flow in a combustion chamber 30 of the engine during the minimum valve lift control operations. By such a swirl effect, it is possible to stabilize the combustion state of the engine and improve the fuel efficiency of the engine even under low-speed, low-load engine conditions during the minimum valve lift control operations. It is further possible to improve the manufacturing and assembling process efficiency of the variable valve system for reductions in process costs as the variable valve system has a simple structure with a single set of the drive cam 5 and the valve lift mechanism 7 (the rocker arm 13 and the link arm 14).

Figure 9:
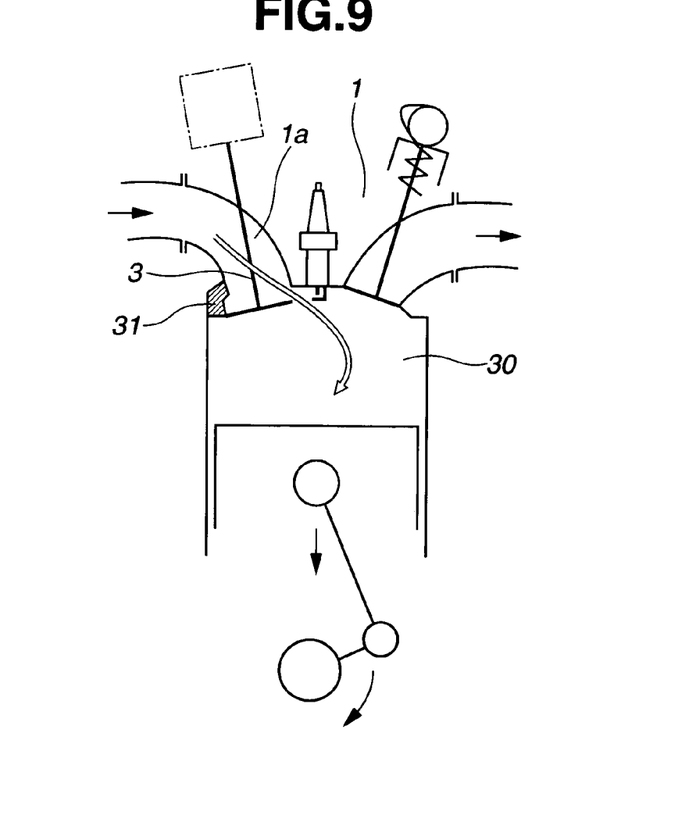
FIGS. 9 and 10 are a sectional view and a top view of a cylinder head of the engine in the case where a masking seal is provided in an engine intake port according to a modification of the first to third embodiments of the present invention.
Figure 10:
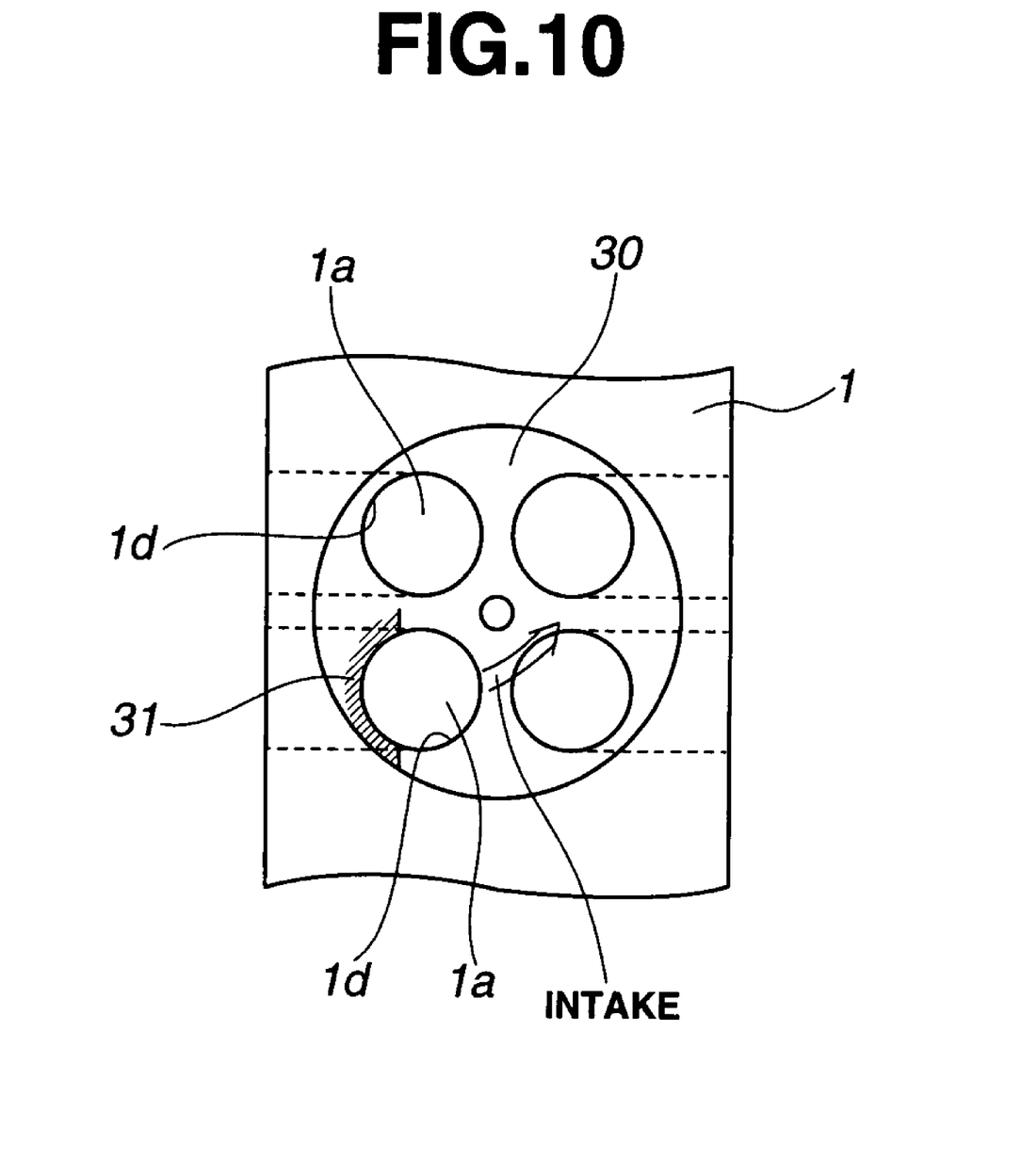

In order to enhance the above intake swirl effect, a masking seal 31 may be provided in some part of an opening 1d of the engine intake port 1a to which the second intake valve 3 having a larger minimum valve lift L1 is mounted as shown in FIGS. 9 and 10. In this case, it is desirable to control the height of the masking seal 31 corresponding to the maximum valve lift of the intake valve 3 for the purpose of sufficiently preventing the influence of the masking seal 31 on the intake charge efficiency under high-speed, high-load engine conditions during maximum valve lift control operations.

During maximum valve lift control operations, the control shaft 24 is rotated in the other direction by the electric actuator under the control signal from the engine controller so that the control cam 25 rotates in a clockwise direction relative to the control shaft 24 as viewed in FIGS. 1, 4A and 4B and becomes held at a given angular position. The rocker arm 13 pivots by such a clockwise rotation of the control cam 25 and lowers the second arm portions 13b and 13c to push down the cam noses of the swing cams 6 through the link rods 15 and 16. The swing positions of the swing cams 6 are thus shifted in a clockwise direction as shown in FIG. 4A with respect to the swing position shown in FIG. 1.

Figure 4D:
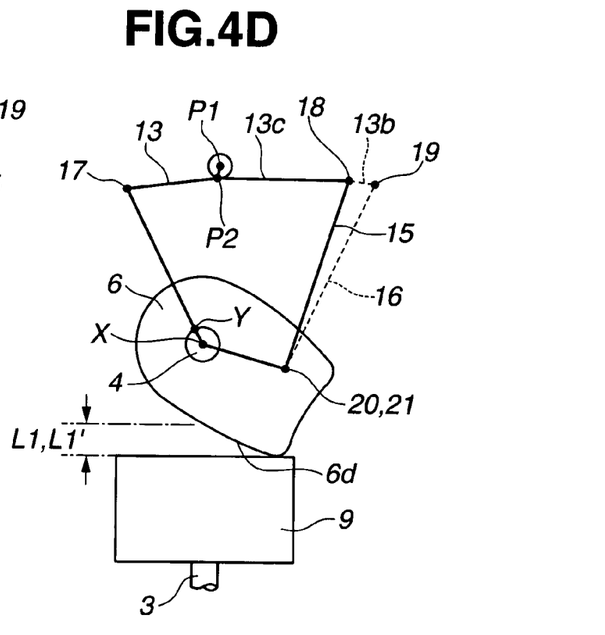
Figure 5B:
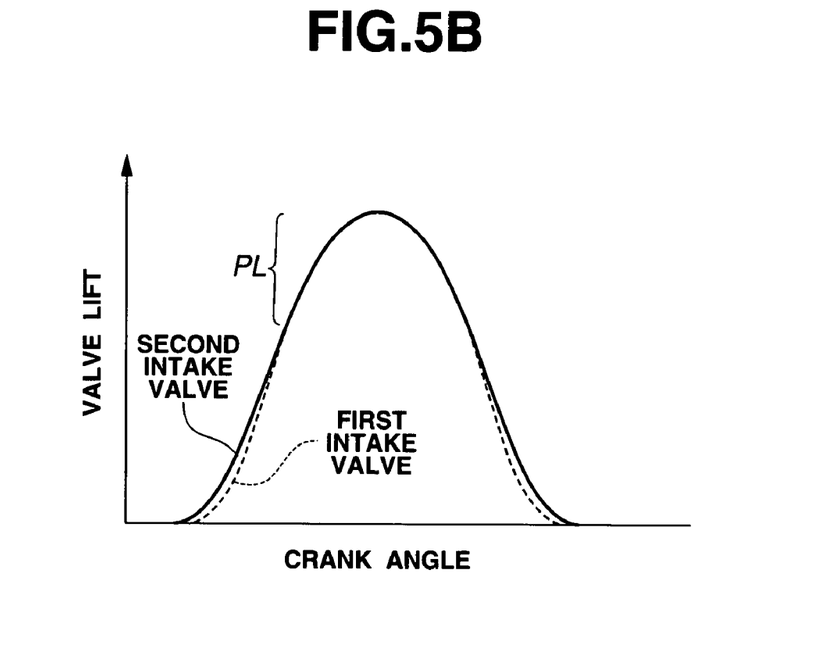
Figure 6A:
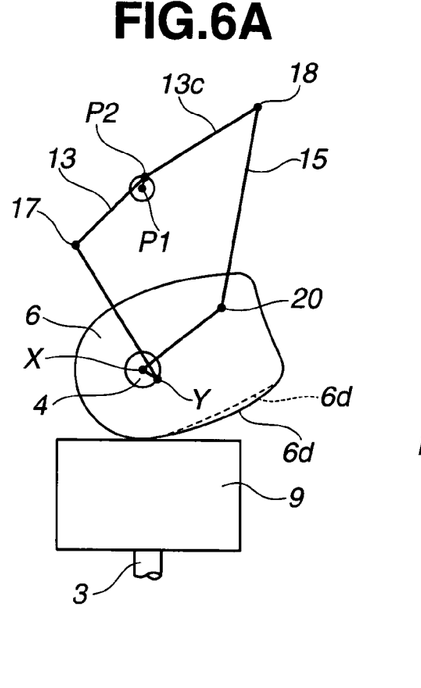
FIGS. 6A to 6D are schematic views showing minimum and maximum valve lift control operations of a variable valve system according to a second embodiment of the present invention.
Figure 6B:
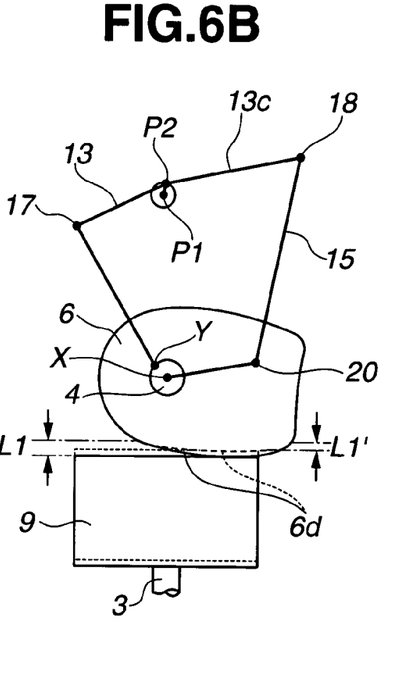
Figure 6C:
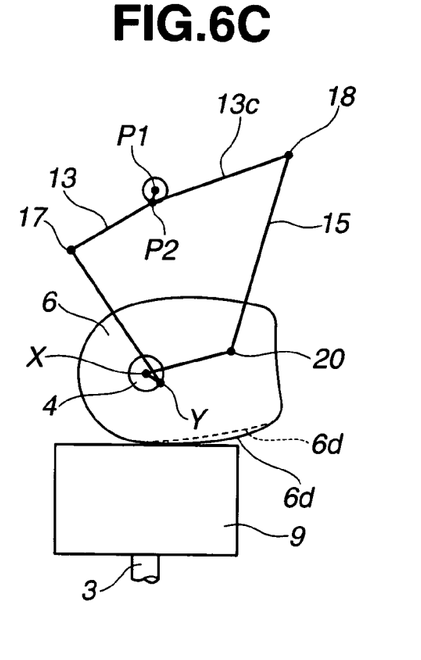
Figure 6D:
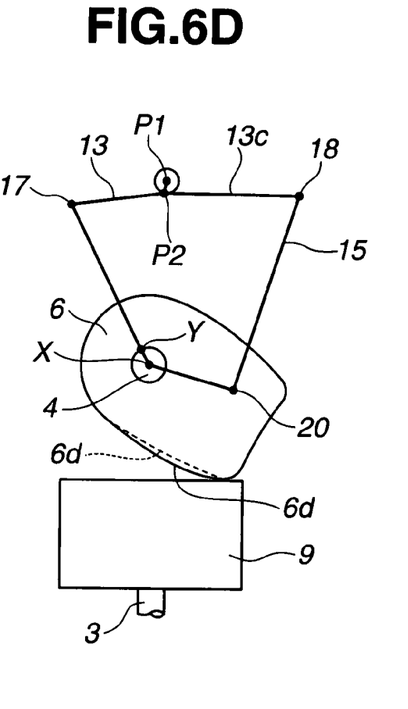

When the drive cam 5 rotates together with the drive shaft 4 in this state, the link arm 14 moves the first arm portion 13a so that the rocker arm 13 swings the swing cams 6 through the link rods 15 and 16. As shown in FIG. 4D, the intake valves 3 are lifted up by contact of the lift areas or cam noses of the swing cams 6 with the valve lifters 9. The valve lifts of the intake valves 3 become so large as to advance the opening timings of the intake valves 3 and retard the closing timings of the intake valves 3 as shown in FIG. 5B. More specifically, the valve lift characteristics of the first and second intake valves 3 are similar in waveform such that the valve lifts of the first and second intake valves 3 are substantially under the maximum valve lift control operations, as shown in FIG. 5B. In the first embodiment, the valve lifts of the first and second intake valves 3 overlap each other in a peak lift region PL, but allow the valve opening timing of the first intake valve 3 to be slightly retarded relative to that of the second intake valve 3 and the valve closing timing of the first intake valve 3 to be slightly advanced relative to that of the second intake valve 3 due to the difference H between the projection amounts of the rocker arm ends 13e and 13f. It is thus possible to improve the engine intake charge efficiency for high power output while limiting the generation of an intake swirl flow in the combustion chamber under high-speed, high-load engine conditions during the maximum valve lift control operations.

Alternatively, the maximum valve lift of the first intake valve 3 may be set slightly smaller than the maximum valve lift of the second intake valve 3 during the maximum valve lift control operations in the case where the valve lifts of the intake valves 3 are set relatively large to strengthen the intake swirl during the minimum valve lift control operations. This makes it possible to obtain further improvement in engine combustion stability under low-speed, low-load engine conditions even though the engine intake charge efficiency (power output) becomes slightly lowered and sacrificed under high-speed, high-load engine conditions.

Furthermore, the rocker ratios of the rocker arm 13 relative to the swing cams 6 may be made different by varying any of the lengths of the connections between the rocker arm 13 and the link rods 15 and 16 e.g. not only the lengths of the rocker arm ends 13e and 13f but also the axial lengths of the link rods 15 and 16, varying the longitudinal lengths of the swing cams 6 and/or varying the positions of the connection pins 20 and 21 between the swing cams 6 and the link rods 15 and 16 along the vertical direction or the swing direction.

Second Embodiment

The variable valve system of the second embodiment is structurally similar to that of the first embodiment, except that the arm ends 13e and 13f of the rocker arm 13 have the same length but the first and second swing cams 6 have different cam profiles in such a manner that the valve lifts of the first and second intake valves 3 are varied differently under the minimum valve lift control operations.

In the second embodiment, some part of the cam face 6d of the first swing cam 6 extending from the base circle area to the ramp area and from the ramp area to the lift area is slightly cut away as indicated by a broken line in FIGS. 6A to 6D so that the cam profile of the cutaway part (i.e. ramp/lift areas) of the first swing cam 6 shows a greater radius of curvature than that of the second swing cam 6 although the base circle area and maximum valve lift area of the first and second swing cams 6 are same in profile. With such a cam profile, the valve lift characteristics of the first and second intake valves 3 are made different under the minimum valve lift control operations and are made substantially the same under the maximum valve lift control operations as in the case with the first embodiment shown in FIGS. 5A and 5B. It is thus possible to obtain a sufficient intake swirl effect and improve engine combustion stability and fuel efficiency under low-speed, low-load engine conditions during the minimum valve lift control operations and possible to improve the engine intake charge efficiency for high power output under high-speed, high-load engine conditions during the maximum valve lift control operations.

The variable valve system of the second embodiment is applicable to the case where the first and second swing cams 6 are linked together to simplify the structure of the valve lift mechanism 7 (such as the rocker arm 13, the link rods 15 and 16 and the like) as disclosed in Japanese Laid-Open Patent Publication No. 2005-344609.

Alternatively, the rocker ratios of the rocker arm 13 relative to the swing cams 6 may be made different by varying both of the lengths of the connections between the rocker arm 13 and the link rods 15 and 16 and the cam profiles of the swing cams 6.

Third Embodiment

Figure 7A:
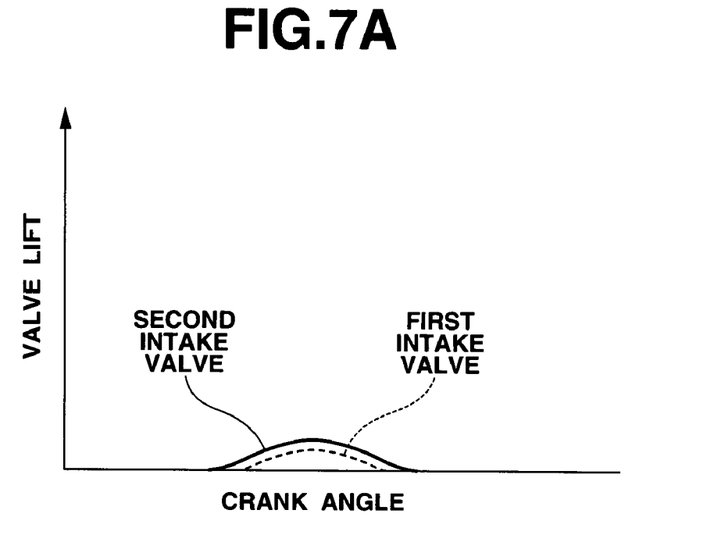
FIGS. 7A and 7B are graphs showing valve lift characteristics of engine valves under minimum and maximum valve lift control operations of a variable valve system according to a third embodiment of the present invention.
Figure 7B:
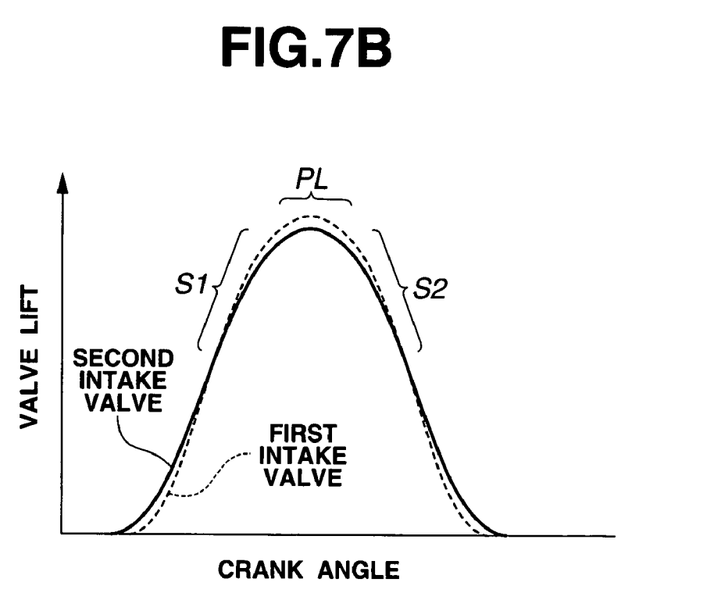

The variable valve system of the third embodiment is structurally similar to those of the first and second embodiments, except that the valve lifts of the first and second intake valves 3 are varied differently, together with the working angles of the first and second intake valves 3, not only under the minimum valve lift control operations but also under the maximum valve lift control operations as shown in FIGS. 7A and 7B.

In the third embodiment, the lift area of the cam face 6d of the first swing cam 6 is set larger to show a greater radius of curvature than that of the second swing cam 6 although the base circle and ramp areas of the cam face 6d of the first swing cam 6 is similar in profile to those of the second embodiment. With such a cam profile, the valve lift of the first intake valve 3 is made smaller than that of the second intake valve 3 as shown in FIG. 7A under the minimum valve lift control operations as in the case with the first embodiment. The difference between the valve lifts of the first and second intake valves 3 is herein set relatively small. It is thus possible obtain a sufficient intake swirl effect and improve engine combustion stability and fuel efficiency under low-speed, low-load engine conditions during the minimum valve lift control operations. Under the maximum valve lift control operations, the valve lift of the first intake valve 3 is made smaller that of the second intake valve 3 in lift initiation and completion regions as shown in FIG. 7B. The opening timing of the second intake valve 3 is advanced relative to that of the first intake valve 3 and the closing timing of the second intake valve 3 is retarded relative to that of the first intake valve 3 under the maximum valve lift control operations as well as under the minimum valve lift control operations. The amount of intake from the second intake valve 3 becomes thus larger than that from the first intake valve 3 to thereby cause an intake swirl even during the maximum valve lift control operations. This can result in a decrease of intake charge efficiency due to an intake density difference in the engine cylinder (combustion chamber 30). However, the valve lift of the first intake valve 3 is slightly made larger than that of the second intake valve 3 in a peak lift region PL and adjacent lift-up and lift-down regions SL1 and SL2 so as to reverse the difference between the valve lifts of the first and second intake valves 3. It is thus possible to cancel out the intake swirl and prevent the intake density difference in the engine combustion chamber 30 for improvement in intake charge efficiency (power output).

The entire contents of Japanese Patent Application No. 2006-337809 (filed on Dec. 15, 2006) are herein incorporated by reference.

Although the present invention has been described with reference to the above-specific embodiments of the invention, the invention is not limited to these exemplary embodiments. Various modification and variation of the embodiments described above will occur to those skilled in the art in light of the above teachings. The variable valve systems of the above embodiments may be applied to the exhaust side of each cylinder in the internal combustion engine. The scope of the invention is defined with reference to the following claims.

What is claimed is:

1. A variable valve system for an internal combustion engine, the engine having first and second engine valves in either an intake side or an exhaust side of each cylinder, the variable valve system comprising:
   a drive shaft rotated by a crankshaft of the engine;
   a drive cam integrally mounted on the drive shaft;
   first and second swing cams mounted on the first and second engine valves, respectively;
   a valve lift mechanism for converting a rotational movement of the drive cam into swing movements of the first and second swing cams so as to open and close the first and second engine valves; and
   a control mechanism for controlling the operating position of the valve lift mechanism so as to vary the valve lifts of the first and second engine valves continuously in accordance with engine operating conditions,
   wherein the valve lifts of the first and second engine valves are different from each other when the control mechanism performs minimum lift control on the valve lift mechanism to control the valve lifts of the first and second engine valves to minimum lifts.

2. The variable valve system according to claim 1, wherein the valve lift mechanism comprises a rocker arm having one side pivotally connected to the drive cam and the other side pivotally connected to the first and second swing cams so as to provide different rocker ratios relative to the first and second swing cams for the different valve lifts of the first and second engine valves under the minimum lift control.

3. The variable valve system according to claim 2, wherein the valve lift mechanism comprises a pair of link rods connected between the rocker arm and the respective first and second swing cams; and the rocker ratios of the rocker arm relative to the first and second swing cams are made different by varying the lengths of connections between the rocker arm and the respective link rods.

4. The variable valve system according to claim 1, wherein the valve lifts of the first and second engine valves are substantially the same when the control mechanism performs maximum lift control on the valve lift mechanism to control the valve lifts of the first and second engine valves to maximum lifts.

5. The variable valve system according to claim 3, wherein the other side of the rocker arm is bifurcated to define two arm ends for connection to the link rods; and the arm ends have different lengths to vary the lengths of the connections between the rocker arm and the link rods.

6. The variable valve system according to claim 3, wherein the link rods have different axial lengths to vary the lengths of the connections between the rocker arm and the link rods.

7. The variable valve system according to claim 2, wherein the valve lift mechanism has a pair of link rods connected between the rocker arm and the respective first and second swing cams; and the rocker ratios of the rocker arm relative to the first and second swing cams are made different by varying the positions of connections between the rocker arm and the respective link rods.

8. The variable valve system according to claim 1, wherein the first and second swing cams have different cam profiles for the different valve lifts of the first and second engine valves under the minimum lift control.

9. The variable valve system according to claim 3, wherein the rocker ratios of the rocker arm relative to the first and second swing cams are made different by varying both of the lengths of the connections between the rocker arm and the link rods and the cam profiles of the first and second swing cams.

10. The variable valve system according to claim 1, wherein the opening timing of the second engine valve is advanced relative to the opening timing of the first engine valve and the closing timing of the second engine valve is retarded to the closing timing of the first engine valve when the control mechanism performs maximum lift control on the valve lift mechanism to control the valve lifts of the first and second engine valves to maximum lifts.

11. The variable valve system according to claim 1, wherein the valve lift of the first engine valve is larger than the valve lift of the second engine valve in a given peak lift region and lift-up and lift-down regions when the control mechanism performs maximum lift control on the valve lift mechanism to control the valve lifts of the first and second engine valves to maximum lifts.

12. The variable valve system according to claim 1, wherein there is a substantially constant amount of difference between the valve lifts of the first and second engine valves, with the opening timing of the second engine valve being advanced relative to the opening timing of the first engine valve and the closing timing of the second engine valve being retarded relative to the closing timing of the first engine valve, under the minimum lift control.

13. The variable valve system according to claim 1, wherein there is a small difference between the valve lifts of the first and second engine valves, with the opening timing of the second engine valve being advanced relative to the opening timing of the first engine valve and the closing timing of the second engine valve being retarded relative to the closing timing of the first engine valve, under the minimum lift control.

14. A variable valve system for an internal combustion engine, the engine having first and second engine valves in either an intake side or an exhaust of each cylinder, the variable valve system comprising:

a drive shaft rotated by a crankshaft of the engine;

a drive cam integrally mounted on the drive shaft;

first and second swing cams mounted on the first and second engine valves, respectively;

a valve lift mechanism for converting a rotational movement of the drive cam into swing movements of the first and second swing cams so as to open and close the first and second engine valves; and a control mechanism for controlling the valve lift mechanism to vary the valve lifts of the first and second engine valves continuously in accordance with engine operating conditions, wherein the valve lifts of the first and second engine valves are different from each other when the control mechanism performs minimum lift control on the valve lift mechanism to control the valve lifts of the first and second engine valves to minimum lifts; and the valve lifts of the first and second engine valves are substantially the same when the control mechanism performs maximum lift control on the valve lift mechanism to control the valve lifts of the first and second engine valves to maximum lifts.

15. The variable valve system according to claim 14, wherein the valve lift mechanism comprises a rocker arm pivoted by the rotational movement of the drive cam to cause the swing movements of the first and second swing cams; and the rocker arm has different rocker ratios relative to the first and second swing cams for the different valve lifts of the first and second engine valves under the minimum lift control.

16. The variable valve system according to claim 14, wherein the first and second swing cams have different cam profiles for the different valve lifts of the first and second engine valves under the minimum lift control.

17. A variable valve mechanism for an internal combustion engine, the engine having first and second engine valves in either an intake side or an exhaust side of each cylinder, the variable valve system comprising:

a drive shaft rotated by a crankshaft of the engine;

a drive cam integrally mounted on the drive shaft;

first and second swing cams mounted on the first and second engine valves, respectively;

a valve lift mechanism for converting a rotational movement of the drive cam into swing movements of the first and second swing cams so as to open and close the first and second engine valves; and a control mechanism for controlling the operating position of the valve lift mechanism so as to vary the valve lifts of the first and second engine valves continuously in accordance with engine operating conditions, wherein the valve lift of the first engine valve is smaller than the valve lift of the second engine valve when the control mechanism performs minimum lift control on the valve lift mechanism to control the valve lifts of the first and second engine valves to minimum lifts; and the valve lift of the first engine valve is larger than the valve lift of the second engine valve when the control mechanism performs maximum lift control on the valve lift mechanism to control the valve lifts of the first and second engine valves to maximum lifts.

18. The variable valve system according to claim 17, wherein the valve lift of the first engine valve becomes larger than the valve lift of the second engine valve in a given peak lift region and lift-up and lift-down regions so as to reverse the difference between the valve lifts of the first and second intake valves under the maximum lift control.

19. The variable valve system according to claim 18, wherein the valve lift mechanism comprises a rocker arm pivoted by the rotational movement of the drive cam to cause the swing movements of the first and second swing cams; and the rocker arm has different rocker ratios relative to the first and second swing cams for the different valve lifts of the first and second engine valves under the minimum lift control.

20. The variable valve system according to claim 18, wherein the first and second swing cams have different cam profiles for the different valve lifts of the first and second engine valves under the minimum lift control.

* * * * *